(12) United States Patent
Rispoli et al.

(10) Patent No.: US 10,316,258 B2
(45) Date of Patent: Jun. 11, 2019

(54) PROCESS FOR THE REFINING OF CRUDE OIL

(75) Inventors: Giacomo Rispoli, Rome (IT); Giuseppe Bellussi, Piacenza (IT)

(73) Assignee: ENI S.P.A., Rome (IT)

( * ) Notice: Subject to any disclaimer, the term of this patent is extended or adjusted under 35 U.S.C. 154(b) by 164 days.

(21) Appl. No.: 13/881,137

(22) PCT Filed: Oct. 27, 2011

(86) PCT No.: PCT/EP2011/068842
§ 371 (c)(1),
(2), (4) Date: Jul. 10, 2013

(87) PCT Pub. No.: WO2012/055957
PCT Pub. Date: May 3, 2012

(65) Prior Publication Data
US 2013/0277274 A1 Oct. 24, 2013

(30) Foreign Application Priority Data

Oct. 27, 2010 (IT) .............................. MI2010A1999

(51) Int. Cl.
*C10G 65/12* (2006.01)
*C10G 7/00* (2006.01)
(Continued)

(52) U.S. Cl.
CPC ............... *C10G 65/12* (2013.01); *C10G 7/00* (2013.01); *C10G 45/16* (2013.01); *C10G 47/26* (2013.01);
(Continued)

(58) Field of Classification Search
CPC ...... B01J 27/043; B01J 27/047; B01J 27/049; B01J 35/0013; C10G 2300/107;
(Continued)

(56) References Cited

U.S. PATENT DOCUMENTS 5,954,945 A * 9/1999 Cayton et al. ................ 208/108
2005/0241991 A1 11/2005 Lott et al.
2009/0326304 A1 12/2009 Bhattacharyya et al.

FOREIGN PATENT DOCUMENTS

EP 2103347 A1 9/2009
WO 2005104749 A2 11/2005
(Continued)

OTHER PUBLICATIONS

Parkash, S, Refining Processes Handbook, 2003, Gulf Publishing, pp. 1-28.*

*Primary Examiner* — Renee Robinson
*Assistant Examiner* — Derek N Mueller
(74) *Attorney, Agent, or Firm* — Tarolli, Sundheim, Covell & Tummino LLP

(57) ABSTRACT

A process for the refining of crude oil, comprising a separation unit of the crude oil, consisting of at least one atmospheric distillation unit for separating the various fractions, a unit for the conversion of the heavy fractions obtained, a unit for improving the quality of some of the fractions obtained by actions on the chemical composition of their constituents, and units for the removal of undesired components, characterized in that the heaviest fraction, the atmospheric distillation residue, is sent to the conversion unit comprising a hydroconversion reactor in slurry phase or of the ebullated bed type, into which hydrogen or a mixture of hydrogen and ¾S is introduced in the presence of a suitable nanodispersed hydrogenation catalyst.

9 Claims, 3 Drawing Sheets

Simplified block scheme of HER oriented towards Virgin naphtha (Pro-chemistry), Kerosene and Gasoils

(51) Int. Cl.
*C10G 45/16* (2006.01)
*C10G 47/26* (2006.01)
*C10G 49/12* (2006.01)
*C10G 65/14* (2006.01)
*C10G 67/16* (2006.01)
*C10G 69/14* (2006.01)
*B01J 27/043* (2006.01)
*B01J 27/047* (2006.01)
*B01J 27/049* (2006.01)
*B01J 35/00* (2006.01)

(52) U.S. Cl.
CPC ............ *C10G 49/12* (2013.01); *C10G 65/14* (2013.01); *C10G 67/16* (2013.01); *C10G 69/14* (2013.01); *B01J 27/043* (2013.01); *B01J 27/047* (2013.01); *B01J 27/049* (2013.01); *B01J 35/0013* (2013.01); *C10G 2300/107* (2013.01); *C10G 2300/206* (2013.01); *C10G 2300/207* (2013.01); *C10G 2300/301* (2013.01); *C10G 2300/4081* (2013.01)

(58) Field of Classification Search
CPC ........ C10G 2300/206; C10G 2300/207; C10G 2300/301; C10G 2300/4081; C10G 45/16; C10G 47/26; C10G 49/12; C10G 65/12; C10G 65/14
See application file for complete search history.

(56) References Cited

FOREIGN PATENT DOCUMENTS

| | | |
|---|---|---|
| WO | 2008141831 A1 | 11/2008 |
| WO | 2009085999 A2 | 7/2009 |
| WO | 2009149923 A1 | 12/2009 |

\* cited by examiner

Simplified block scheme of a real complex-cycle refinery

Simplified block scheme of HER oriented towards Gasolines, Kerosene and Gasoils

Simplified block scheme of HER oriented towards
Virgin naphtha (Pro-chemistry), Kerosene and Gasoils

PROCESS FOR THE REFINING OF CRUDE OIL

RELATED APPLICATION

This application is a National Phase filing of PCT/EP2011/068842, filed Oct. 27, 2011, and claims priority to Italian Application No. MI2010A001999, filed Oct. 27, 2010, the subject matter of which are incorporated herein by reference in their entirety.

The present invention describes a process for the refining of crude oil in which the separation unit of the crude oil consists of the atmospheric distillation column only, the sub-atmospheric distillation column being substituted with a hydroconversion step.

Current refineries were conceived starting from demands which were generated in the last century straddling the Second World War and evolved considerably starting from the years 1950-1960 when the significant increase in the request for mobility caused a rapid increase in the demand for gasoline. Two refining schemes were therefore developed, a simple cycle scheme or Hydroskimming and a complex scheme ("La raffinazione del petrolio" (Oil refining), Carlo Giavarini and Alberto Girelli, Editorial ESA 1991). In both schemes, the primary operations are the same: the crude oil is pretreated (Filtration, desalination), then sent to the primary distillation section. In this section, the crude oil is first fed to a distillation column at atmospheric pressure (Topping) which separates the lighter distillates, whereas the atmospheric residue is transferred to a sub-atmospheric distillation column (Vacuum) which separates the heavy distillates from the vacuum residue. In the simple cycle scheme, the vacuum residue is substantially used for the production of bitumens and fuel oil. The complex cycle scheme was conceived for further converting the bottom of the barrel to distillates and for maximizing the production of gasoline and its octane content. Units were therefore added for promoting the conversion of the heavier fractions (Various Catalytic Cracking, Thermal cracking, Visbreaking, Coking technologies) together with units for promoting the production of gasoline having a maximum octane content (Fluid Catalytic Cracking, Reforming, Isomerization, Alkylation).

FIG. 1 shows a simplified block scheme of a complex cycle refinery whose description is provided in Comparative example 1.

Figure 1:
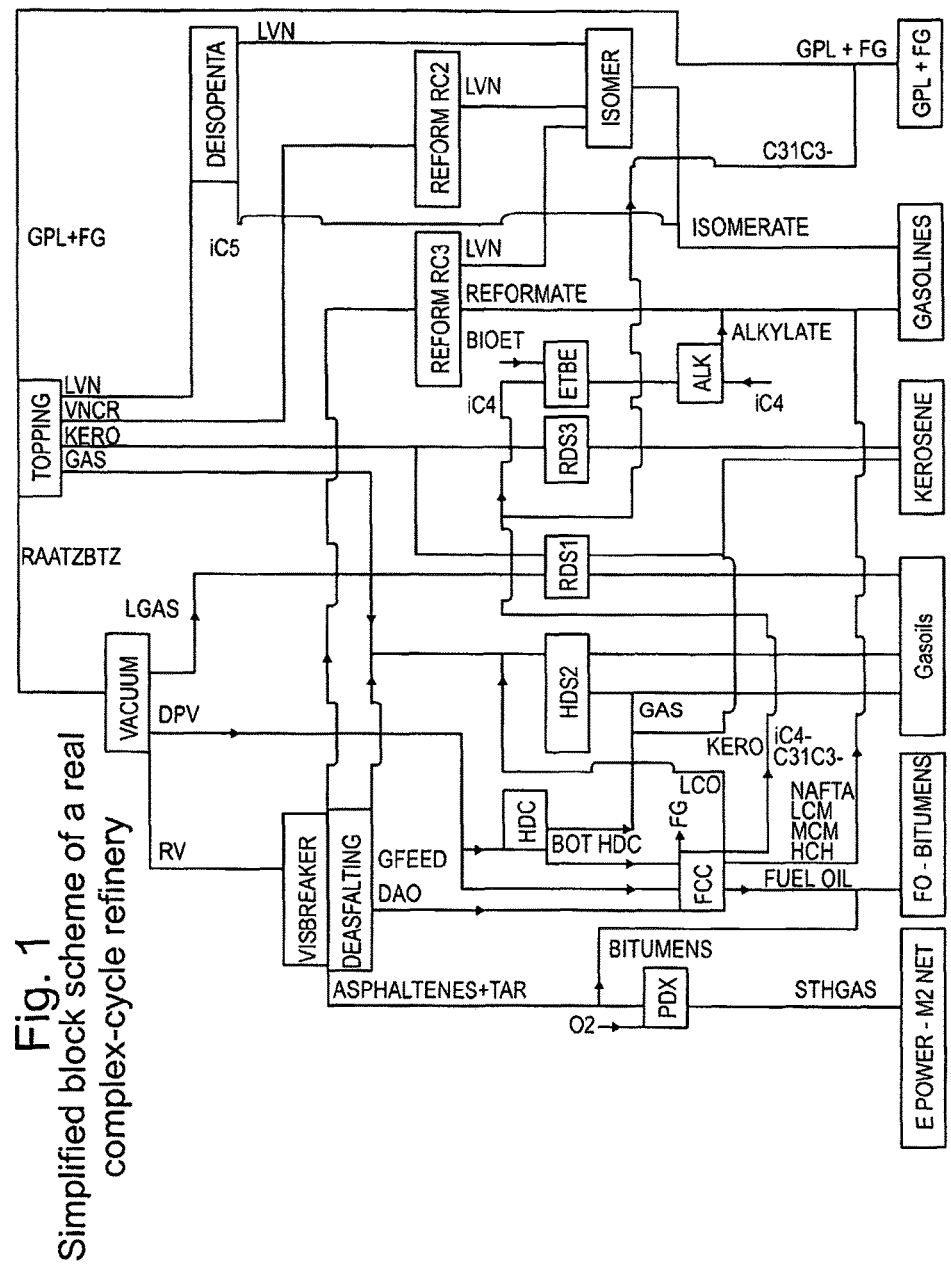
FIG. 1 is a simplified block scheme of a real complex-cycle refinery.

With respect to the period in which these schemes were conceived, there has been an enormous variation in the surrounding scenario. The increase in the price of crude oils and environmental necessities are pushing towards a more efficient use of fossil resources. Fuel oil, for example, has been almost entirely substituted by natural gas in the production of electric energy. It is therefore necessary to reduce or eliminate the production of the heavier fractions (Fuel oil, bitumens, coke) and increase the conversion to medium distillates, privileging the production of gasoil for diesel engines, whose demand, especially in Europe, has exceeded the request for gasoline. Other important change factors consist in the progressive deterioration in the quality of crude oils available and in the quality increase of fuels for vehicles, imposed by the regulatory evolution for reducing environmental impact. The pressure of these requirements has caused a further increase in the complexity of refineries with the addition of new forced conversion technologies: hydrocracking at a higher pressure, gasification technologies of the heavy residues coupled with the use of combined cycles for the production of electric energy, technologies for the gasification or combustion of coke oriented towards the production of electric energy.

The increase in the complexity led to an increase in the conversion efficiency, but increased energy consumptions and made operative and environmental management more difficult. New refining schemes must therefore be found which, although satisfying the new demands, allow a recovery of the efficiency and operative simplicity.

In the last twenty years, important efforts have been made for developing hydrocracking technologies capable of completely converting heavy crude oils and sub-atmospheric distillation residues into distillates, avoiding the coproduction of fuel oil and coke. An important result in this direction was obtained with the development of the EST technology (Eni Slurry Technology) described in the following patent applications:

IT-MI95A001095, IT-MI2001A001438,
IT-MI2002A002713, IT-MI2003A000692,
IT-MI2003A000693, IT-MI2003A002207,
IT-MI2004A002445, IT-MI2004A002446,
IT-MI2006A001512, IT-MI12006A001511,
IT-MI12007A001302, IT-MI12007A001303,
IT-MI12007A001044, IT-MI12007A1045,
IT-MI12007A001198, IT-MI12008A001061

With the application of this technology, it is in fact possible to reach the desired total conversion result of the heavy fractions to distillates. It has now been found that, by substituting the sub-atmospheric distillation section with a hydroconversion section according to said EST technology, a new refinery scheme can be obtained which, although allowing the total conversion of the crude oil, is much simpler and advantageous from an operative, environmental and economical point of view. The application of the process claimed allows a reduction in the number of unitary operations, storage tanks of the raw materials and semi-processed products and consumptions, in addition to an increase in the refining margins with respect to a modern refinery, used as reference.

The process claimed allows to obtain the total conversion of the crude oil fed, to gas, naphtha, and gasoil having a modest quantity of tars as single by-product.

The process, object of the present invention, for the refining of crude oil comprising a unit for separating crude oil, consisting of at least one atmospheric distillation unit for separating the various fractions, units for the conversion of the heavy fractions obtained, units for improving the quality of some of the fractions obtained by actions on the chemical composition of their constituents, and units for the removal of undesired components, is characterized in that the heaviest fraction, the atmospheric distillation residue, is sent to the conversion unit comprising at least one hydroconversion reactor in slurry phase or of the ebullated bed type, into which hydrogen or a mixture of hydrogen and $H_2S$ is introduced in the presence of a suitable nanodispersed hydrogenation catalyst.

Said conversion unit substitutes the sub-atmospheric distillation section.

The sub-atmosferic distillation section constitutes with the atmospheric distillation unit the separation unit in the current refineries.

The term nanodispersed means a dispersed catalyst having dimensions in the order of units to hundreds of nanometers.

The nanodispersed hydrogenation catalyst can be based on Mo sulfide and/or Fe and/or W and/or Cr and/or Ni and/or Co sulfide and mixtures of the same, and can be formed in situ, starting from a precursor. A co-catalyst can also possibly be present in the hydroconversion, said co-catalyst having particles of nanometric or micronic dimensions, selected from cracking and/or denitrogenation catalysts, such as zeolites having small-sized crystals and with a low aggregation degree between the primary particles, oxides, sulfides or precursors of Ni and/or Co, mixed with Mo and/or W. Further details on the use of said co-catalyst can be found in the above-mentioned patent application IT-MI2008A001061.

The reactor used in the present invention is preferably run under hydrogen pressure or a mixture of hydrogen and hydrogen sulfide, ranging from 100 to 200 atmospheres, within a temperature range of 350 to 480° C., preferably ranging from 380 to 450° C. Although any hydroconversion process can be used, effected with hydroconversion reactors in slurry phase in which the catalyst is nanodispersed, and in particular all processes of the EST technology described in the patent applications cited above, it is preferable to use the processes of the EST technology indicated hereunder.

Preferred hydroconversion processes are those of the EST technology in which solid accumulation reactors are adopted as hydroconversion reactors. One of these preferred processes comprises sending the distillation residue to a solid accumulation hydroconversion reactor (RIAS), preferably a bubble tower, which includes one or more stripping phases with a suitable hot stripping gas so as to obtain the conversion products in vapour phase. Further details on this specific hydroconversion process can be found in patent application IT-MI-2007A-001044 indicated above.

Another of these preferred processes comprises sending the distillation residue to a solid accumulation hydroconversion reactor of the bubbling tower type in the presence of a catalyst based on molybdenum so as to obtain the hydroconversion products in vapour phase directly at the reactor. Further details on this specific hydroconversion process can be found in patent application IT-MI-2007A-001044 already indicated above.

A further preferred hydroconversion process in which a denitrification also takes place, comprises sending the distillation residue to a hydroconversion reactor, where the products having a boiling point higher than 380° C., obtained by partial condensation of the gas phase leaving said reactor, before or after separation of the non-converted asphaltene liquid, and possibly obtained by extraction under vacuum of the asphaltene liquid itself before being recycled to the reactor, are sent back to said hydroconversion reactor, so that the conversion products extracted can be distilled for at least 60% by weight at 380° C. This denitrification and hydroconversion process is described in patent application IT-MI2010A001989 of the same applicant of which the most significant details are provided.

The process, claimed in said patent application, for the denitrification and hydrocracking of heavy oils to totally converted products, which comprises sending the heavy oil to a hydrocracking step, effected in an appropriate reactor with a suitable hydrogenation catalyst and with the introduction of hydrogen or a mixture of hydrogen and $H_2S$, is characterized by sending the products having a boiling point higher than 380° C., obtained by partial condensation of the gas phase leaving the reactor before or after separation of the non-converted asphaltene liquid, and possibly obtained by vacuum extraction of aphaltine liquid itself before being recycled to the reactor, back to the hydrocracking reactor, so that the conversion products extracted can be distilled for at least 60%, preferably at least 80%, more preferably at least 95%, even more preferably at least 99%, by weight at 380° C. By regulating the conditions of said partial condensation and possibly the reflux conditions at the vacuum column which extracts the products from the non-converted asphaltene liquid, the quantity of high-boiling products is determined, which are sent back to the hydrocracking step and, complementarily, the fraction of hydroconverted product which is vice versa extracted.

This process, which enables high concentrations of nitrogenated tails to be kept in reaction, even when operating under high-temperature conditions, allows the extraction of products having a low nitrogen content and with a complete conversion degree (95% of distillable product at 380° C.) which can be fed directly to the desulfurization unit.

The hydrogenation catalyst is preferably based on molybdenum, more preferably in slurry phase, and can be a decomposable precursor or a preformed compound and can possibly contain additionally one or more transition metals. The reactor used is preferably run under hydrogen pressure or a mixture of hydrogen and hydrogen sulfide, ranging from 100 to 200 atmospheres, within a temperature range of 400 to 480° C. The present invention can be applied to any type of hydrocracking reactor, such as a stirred tank reactor or preferably a slurry bubbling tower. The slurry bubbling tower, preferably of the solid accumulation type (described in the above patent application IT-MI2007A001045), is equipped with a reflux loop, whereby the hydroconversion products obtained in vapour phase are partially condensed and the condensate sent back to the hydrocracking step. Again, in the case of the use of a slurry bubbling tower, it is preferable for the hydrogen to be fed to the base of the reactor through a suitably designed apparatus (distributor on one or more levels) for obtaining the best distribution and the most convenient average dimension of the gas bubbles and consequently a stirring regime which is such as to guarantee conditions of homogeneity and a stable temperature control even when operating in the presence of high concentrations of solids, produced and generated by the charge treated, when operating in solid accumulation. If the asphaltene stream obtained after separation of the vapour phase is subjected to distillation for the extraction of the products, the extraction conditions must be such as to reflux the heavy cuts in order to obtain the desired conversion degree.

With respect to hydroconversion processes using ebullated bed reactors, in addition to the nanodispersed hydrogenation catalyst, the presence of a suitable supported heterogeneous hydroconversion catalyst is also necessary. In this case, the hydroconversion process comprises sending the distillation residue to one or more ebullated bed hydroconversion reactors, into which hydrogen or $H_2S$ is introduced and sending the effluent stream from said reactor(s) to a separation step in which the liquid fraction separated and containing the nanodispersed catalyst is recycled to said ebullated bed reactor(s). Further details on the process using ebullated bed reactors and supported heterogeneous hydroconversion catalysts can be found in the already mentioned patent application IT-MI 2007A001198.

EXAMPLES

Some examples are provided hereunder, which help to better define the invention without limiting its scope. An actual complex-cycle modern refinery, optimized over the years for reaching the total conversion of the feedstock fed, has been taken as reference.

The reference feedstock, used for examples 1, 2, 3 is the following (in kton/month):

| | |
|---|---|
| BTZ FEEDSTOCKS (38°API, 0.16% S) | 248.7 |
| AMNA (37° API, 0.13% S) | 38.8 |
| AZERI (36° API, 0.17% S) | 150.4 |
| CPC BLEND (44°API, 0.16% S) | 11.0 |
| OTHERS | 27.4 |
| ATZ FEEDSTOCKS (33°API, 1.3% S) | 482.3 |
| IRANIAN LIGHT (33° API, 1.5% S) | 35.5 |
| URAL (32° API, 1.4% S) | 346.8 |
| CPC BLEND (44° API, 0.22% S) | 61.0 |
| OTHERS | 39.0 |
| TOTAL | 731.0 |

The material balances and consumptions of the EST section corresponding to the simplified block schemes provided in Examples 2, 3 and 4 relate to the configuration using hydroconversion reactor(s) with the recirculation and extraction of products in vapour phase (160 bar, 440° C.), using nanodispersed catalysts based on molybdenite and in accordance with the information provided in the above-mentioned patent applications.

| Input | | Output | |
|---|---|---|---|
| Hydrogen (415.5 ton/d) (193900 Nm³/h) | 4% | Fuel gas (571 ton/d) | 5.5% |
| | | GPL (1329 ton/d) | 12.8% |
| Atmospheric residue | 100% | Naphtha L. (689 ton/d)) to isomerization | 13.5% |
| | | Naphtha H. (1378 ton/d) to reforming | 13.3% |
| | | Gasoils (6700 ton/d) to desulfurization | 64.5% |
| | | Purge (135 ton/d) | 1.3% |

Consumptions: 77 KgEP/ton (including H₂), of which: MP Steam 7.7, HP Fuel Gas 79.4, LP Fuel Gas −107.3, EE −56.8

Platt's data available from for the month of July 2010 were used for the upgrading of the products, whereas the Eni reference values, indicated in Table 1 were used for the unfinished products.

TABLE 1

| Upgrading of products | |
|---|---|
| Products | FOB €/ton |
| Syn gas[2] | 99.7 |
| Fuel gas[2] | 493.7 |
| LPG[1] | 489.7 |
| RON 95 gasoline[1] | 556.8 |
| Jet A1[1] | 538.3 |
| Auto gasoil[1] | 557.6 |
| F.O..D. ATZ[1] | 335.3 |
| F.O..D. BTZ[1] | 366.6 |
| Solid sulfur[2] | 1.5 |
| ATZ atm. res.[2] | 360.7 |
| MTBE[2] | 645.0 |

TABLE 1-continued

| Upgrading of products | |
|---|---|
| Products | FOB €/ton |
| Virgin naphtha FR[1] | 485.9 |
| CatFeed[2] | 445.8 |
| Pitch[2] | 71.9 |

Scenario July 2010
[1]Ptatt source: quotation Avg FOB Med; GPL: propane 70%, butane 30% FOB Algeria
[2]Source Eni-R&M - Exchange rate 1€ = 1.2328$

Example 1 (Comparative)

In this example, the simplified block scheme is provided of an existing complex-cycle refinery situated in Northern Italy with the average quantities and material balances in the month of June 2010 (FIG. 1). This refinery has forced conversion units, such as FCC, visbreaking and residue gasification and is oriented towards the total conversion of the crude oil.

The refining cycle is briefly described hereunder.

Topping Plant

The mixture of ATZ and BTZ crude oils, desalted and preheated, is sent to the Topping plant for atmospheric fractionation, obtaining, in addition to fuel gas and LPG, the following products:

Light Virgin Naphtha (LVN): this is de-isopentanized in the De-isopenta plant and subsequently processed in the isomerization plant (TIP). The isomerized product flows into the gasoline pool.

Virgin Naphtha Charge Reformer (VNCR): this is a heavier Naphtha than the previous one processed in the Reforming plant RC2. The light fraction obtained is a LVN which is processed in the TIP plant, subsequently flowing into the gasoline pool, whereas the heavy fraction is the reformate which goes to the gasoline pool.

Kero: the stream is sent to the desulfurization units HDS1 and HDS3, obtaining desulfurized kero which goes to end-products.

Topping gasoil: the stream is sent to the desulfurization units HDS3 and HDS1, obtaining desulfurized gasoil which goes to end-products.

Atmospheric residue (RA): this is processed in the Vacuum plant.

Vacuum Plant

The plant receives the atmospheric residue (AR) and subjects it to a vacuum distillation process. In addition to gaseous products, vacuum gasoil (LGAS) is obtained, which is desulfurized in the unit HDSL and then goes to end-products, together with catfeed or deep-vacuum (DPV) sent to the conversion plants of Hydrocracking and FCC. The Vacuum residue (RV) is then processed in the Visbreaking unit.

Visbreaking Unit

This converts the Vacuum residue (VR) to gaseous products (fuel gas, propane, butane, etc.) and Virgin Naphtha which is subsequently processed in the Reformer unit RC3: the reformate obtained goes to the gasoline pool. The Visbreaking gasoil and catfeed are processed by the Hydrocracking and FCC plants, whereas the residue (TAR VB) is partly destined for the production of F.O. (Fule Oil) and bitumens and partly subjected to a de-asphalting process.

Hydrocracking Plant

The refinery has two Hydrocracking plants. The first HDC has Vacuum catfeed (DPV) and Visbreaking catfeed, Visbreaking gasoil and other semi-processed products, as input streams. Gaseous products (fuel gas, propane, butane, etc.) both light and heavy Virgin Naphtha, kero and desulfurized gasoil are obtained, which go to end-products.

The Virgin Naphtha undergoes the same processings described above, flowing into the gasoline pool.

The residue (BOT HDC) forms the input stream for the second HCD together with Vacuum catfeed (DPV). The products are the same as those in the first HDC.

For the sake of simplicity the two HDC units are represented as a single HDC, into which the residue (BOT HDC) is sent for conversion to FCC.

Desulfurization Plants

The refinery in the example is equipped with three distinct desulfurization plants (HDS), used for satisfying the sulfur specifications. The main streams in the feeding to these units are Kero, Gasoil, LCO.

De-Asphalting Plant

This is fed by the Visbreaking residue (TAR VB). The output streams consist of de-asphalted oil (DAO), subsequently processed in the FCC, and asphaltenes which are fed to the gasification plant (Partial Oxidation PDX) to produce syngas. The syngas obtained is destined for the electric supply network for the production of energy and also for the production of hydrogen.

FCC Plant

This is fed by DAO coming from the De-Asphalting plant, Visbreaking catfeed, the HDC residue (BOT HDC) and atmospheric residue (RA).

The products obtained in addition to gas, are propylene, butylene and cracked Naphtha (LCN, MCN, HCN) sent to the gasoline pool.

LCO is also obtained, which is desulfurized in the HDS2 plant and sent to the gasoil pool, together with HCO used a fluxing agent for bitumen and FO.

ETBE Plant

The plant is charged with purchased bioethanol and with isobutylenes in order to obtain bioETBE to be sent to the alkylation plant (ALK) whose output, the alkylated products, flows into the gasoline pool.

DEISOPENTA Plant

The purpose of this plant is to separate the isopentane from the LVN stream and send it to the gasoline pool. The deisopentanized LVN is sent to the isomerization plant.

Reforming Plant

The purpose of the two reforming plants (RC) is to increase the octane number of the heavy Virgin naphtha producing Reformate which is sent to the gasoline pool and at the same time hydrogen for the refinery. The refining cycle described also envisages, in addition to the crude oils at the input, the use of semi-processed products which can be used for the optimization of the same cycle, purchased or stored in the refinery, consisting in atmospheric residue, MTBE to bring the gasoline pool and catfeed up to specification requirements.

The following tables respectively indicate the capacity available/percentage of use (Table 2) and the material balance of the products (Table 3):

TABLE 2

| Capacity/use | |
| --- | --- |
| Kton/month; % use | Base case Ex. 1 |
| CDU | 731.0 (100%) |
| VDU | 327.0 (78%) |
| Gasoil HDS 1 | 46.0 (100%) |
| Kero HDS 1 | 16.8 (100%) |
| HDS 2 | 144.0 (100%) |
| HDS 3 | 72.0 (100%) |
| EST | |
| Reforming 2 | 57.0 (100%) |
| Reforming 3 | 75.0 (100%) |
| Isomerization | 41.1 (100%) |
| Hydrogen | 6.0 |
| Alkylation | 17.7 (57%) |
| ETBE | 3.6 (57%) |
| FCC | 159.0 (60%) |
| Hydrocracker 1 | 115.2 (100%) |
| Hydrocracker 2 | 115.2 (100%) |
| Visbreaker | 153.0 (73) |
| BDA | 48.0 (100%) |
| Gasification | 36.0 (100%) |

TABLE 3

| Material Balance | |
| --- | --- |
| Products Kton/month | 742.1 |
| Syn gas | 35.7 |
| Fuel gas | |
| LPG | 17.9 |
| Gasoline | 213.6 |
| Virgin Naphtha FR | 13.6 |
| Kero | 79.0 |
| Gasoils | 344.2 |
| O.C. ATZ/Pitch | 24.9 |
| O.C. BTZ | 7.3 |
| Sulfur | 5.9 |
| Feedstock Kton/month | 792 |
| Mix crude oils | 731.0 |
| Atm. Residue | 7.5 |
| MTBE | 8.1 |
| CatFeed | 45.4 |
| Total C&P | 49.9 |
| Consumptions | 44.3 |
| Losses | 5.7 |

The relative economic margins are indicated in Table 4.

TABLE 4

| Economic result | |
| --- | --- |
| M €/month | Base case Ex. 1 |
| Yields from products | 383.3 |
| Syn Gas | 3.6 |
| Fuel Gas | |
| LPG | 8.8 |
| Gasoline | 118.9 |
| Virgin Naphtha FR | 6.6 |
| Kero | 42.5 |
| Gasoils | 191.9 |
| F.O.. ATZ/Pitch | 8.3 |
| F.O.. BTZ | 2.7 |
| Sulfur | — |
| Cost crude oils and S/L | 336.4 |
| Raw material cost | 28.1 |
| ATM Residue (AR) | 2.7 |
| MTBE | 5.2 |
| CatFeed | 20.2 |
| Total crude oils MP | 364.5 |
| Operative gross margin | 18.8 |

Example 2 (High-Efficiency Refinery, HER, Oriented Towards Gasoline, Kerosene and Gasoils)

Figure 2:
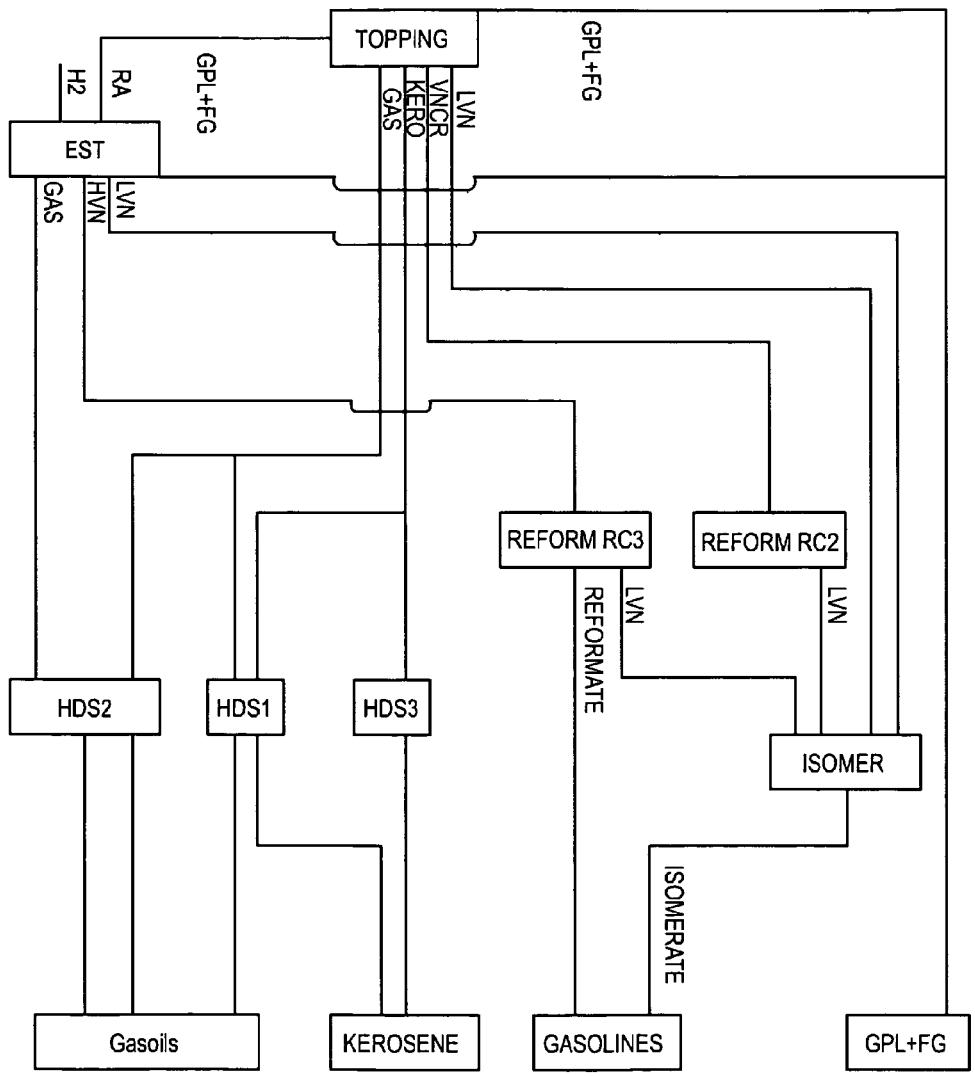
FIG. 2 is simplified block scheme of HER oriented towards Gasolines, Kerosene and Gasoils.

The reference scheme for this case is indicated in FIG. 2. With respect to the complex-cycle refinery, the sub-atmospheric distillation section was substituted by a reactor with the EST technology, described in patent application IT-MI2010A001989 already mentioned above, suitably dimensioned for receiving all the atmospheric residue feedstock (AR).

For the streams leaving the topping plant, the previous description of the complex-cycle refinery can be applied. The output streams from the EST section, comprising one or more hydroconversion units and separation and purge units of the products, consist of the C4-fraction for the production of fuel gas and LPG, Light Virgin Naphtha (LVN), Heavy Virgin Naphtha (HVN), gasoil and a modest quantity of purge.

Whereas the gasoil is sent to the desulfurization unit and subsequently to gasoil pools, the light naphtha is treated in the isomerization plant from which the isomerate is obtained, and the heavy Naphtha in the reformer from which the reformate is obtained. The isomerate and reformate flow into the gasoline pool. The capacity of the desulfurization plants HDS2 and HDS3, the Isomerization plant and Reforming plant RC3 was suitably increased to receive the streams coming from the EST plant.

The following tables respectively indicate the capacity available/percentage of use (Table 5) and the material balance of the products (Table 6):

TABLE 5

Capacity/use

| Kton/month; % use | Base case Ex. 1 | HER Ex. 2 |
|---|---|---|
| CDU | 731.0 (100%) | 731.0 (100%) |
| VDU | 327.0 (78%) | |
| Gasoil HDS 1 | 46.0 (100%) | 46.0 (100%) |
| Kero HDS 1 | 16.8 (100%) | 16.8 (100%) |
| HDS 2 | 144.0 (100%) | 347.0 (100%) |
| HDS 3 | 72.0 (100%) | 76.0 (100%) |
| EST | | 324.1 (100%) |
| Reforming 2 | 57.0 (100%) | 57.0 (100%) |
| Reforming 3 | 75.0 (100%) | 84.3 (100%) |
| Isomerization | 41.1 (100%) | 67.1 (100%) |
| Hydrogen | 6.0 | 12.5 |
| Alkylation | 17.7 (57%) | |
| ETBE | 3.6 (57%) | |
| FCC | 159.0 (60%) | |
| Hydrocracker 1 | 115.2 (100%) | |
| Hydrocracker 2 | 115.2 (100%) | |
| Visbreaker | 153.0 (73) | |
| BDA | 48.0 (100%) | |
| Gasification | 36.0 (100%) | |

TABLE 6

Material Balance

| | Base case Ex. 1 | HERx 2 | Variat. % |
|---|---|---|---|
| Products Kton/month | 742.1 | 702.5 | |
| Syn Gas | 35.7 | | |
| Fuel Gas | | 18.1 | |
| LPG | 17.9 | 48.6 | 171% |
| Gasoline | 213.6 | 167.1 | −22% |
| Virgin Naphtha FR | 13.6 | | |
| Kero | 79.0 | 87.4 | +11% |
| Gasoils | 344.2 | 371.6 | +8% |
| F.O. ATZ/Pitch | 24.9 | 3.1 | |

TABLE 6-continued

Material Balance

| | Base case Ex. 1 | HERx 2 | Variat. % |
|---|---|---|---|
| F.O. BTZ | 7.3 | | |
| Sulfur | 5.9 | 6.6 | |
| Feedstocks Kton/month | 792 | 731 | |
| Mix. crude oils | 731 | 731 | |
| Atm. Residue | 7.5 | | |
| MTBE | 8.1 | | |
| CatFeed | 45.4 | | |
| C&P | 49.9 | 28.5 | −43% |
| Consumptions | 44.3 | 24.3 | −45% |
| Losses | 5.7 | 4.2 | −25% |

The economic data indicated in Table 7 derive from these material balances.

TABLE 7

Economic result

| M €/month | Base case Ex. 1 | HER Ex. 2 |
|---|---|---|
| Yields from products | 383.3 | 380.3 |
| Syn Gas | 3.6 | |
| Fuel Gas | | 8.9 |
| LPG | 8.8 | 23.8 |
| Gasoline | 118.9 | 93.1 |
| Virgin Naphtha FR | 6.6 | |
| Kero | 42.5 | 47.1 |
| Gasoils | 191.9 | 207.2 |
| F.O. ATZ/Pitch | 8.3 | 0.2 |
| F.O.. BTZ | 2.7 | |
| Sulfur | — | |
| Crude oil and S/L cost | 336.4 | 336.4 |
| Raw material cost | 28.1 | |
| Atm Residue | 2.7 | |
| MTBE | 5.2 | |
| CataFeed | 20.2 | |
| Total crude oils and MP | 364.5 | 336.4 |
| Operative gross margin | 18.8 | 43.8 |
| Δ Margin | | +25.1 |
| (€/ton) | | +34.4 |

Example 3 (High-Efficiency Refinery, RAE, Oriented Towards Virgin Naphtha, Kerosene and Gasoils)

Figure 3:
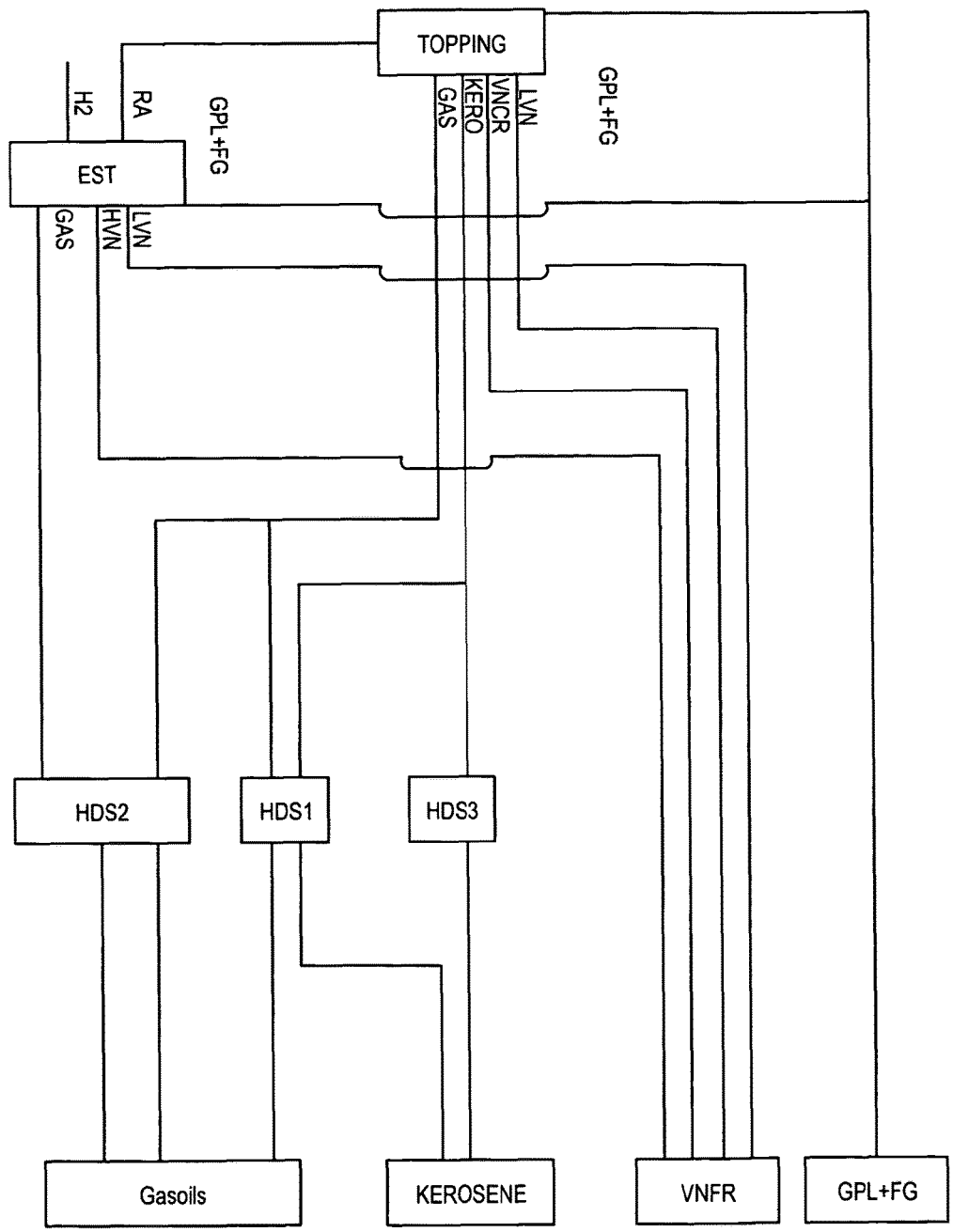
FIG. 3 is a Simplified block scheme of HER oriented towards Virgin naphtha (Pro-chemistry), Kerosene and Gasoils.

In this case, the refinery scheme is even simpler and is provided in FIG. 3. It comprises the same EST section as Example 2 cited above from which the same streams are discharged, and functioning under the same operative conditions. As the VN, both light and heavy, is used totally for petrochemistry, the Isomerization and Reforming units are no longer necessary. This leads to a considerable plant simplification with a consequent reduction in the relative investment.

The following tables respectively indicate the capacity available/percentage of use (Table 8) and the material balance of the products (Table 9):

TABLE 8

Capacity/use

| Kton/month; % use | Base case Ex. 1 | HER Ex. 2 |
|---|---|---|
| CDU | 731.0 (100%) | 731.0 (100%) |
| VDU | 327.0 (78%) | |
| Gasoil HDS 1 | 46.0 (100%) | 46.0 (100%) |

TABLE 8-continued

Capacity/use

| Kton/month; % use | Base case Ex. 1 | HER Ex. 2 |
|---|---|---|
| Kero HDS 1 | 16.8 (100%) | 16.8 (100%) |
| HDS 2 | 144.0 (100%) | 347.0 (100%) |
| HDS 3 | 72.0 (100%) | 76.0 (100%) |
| EST | | 324.1 (100%) |
| Reforming 2 | 57.0 (100%) | |
| Reforming 3 | 75.0 (100%) | |
| Isomerization | 41.1 (100%) | |
| Hydrogen | 6.0 | 12.5 |
| Alkylation | 17.7 (57%) | |
| ETBE | 3.6 (57%) | |
| FCC | 159.0 (60%) | |
| Hydrocracker 1 | 115.2 (100%) | |
| Hydrocracker 2 | 115.2 (100%) | |
| Visbreaker | 153.0 (73) | |
| BDA | 48.0 (100%) | |
| Gasification | 36.0 (100%) | |

TABLE 9

Material Balance

| | Base case Ex. 1 | HER Ex 2 | Variat. %. |
|---|---|---|---|
| Products Kton/month | 742.1 | 707.8 | |
| Syn Gas | 35.7 | | |
| Fuel Gas | | 7.9 | |
| LPG | 17.9 | 35.5 | 98% |
| Gasoline | 213.6 | | |
| Virgin Naphtha FR | 13.6 | 195.7 | |
| Kero | 79.0 | 87.4 | +11% |
| Gasoils | 344.2 | 371.6 | +8% |
| F.O.. ATZ/Pitch | 24.9 | 3.1 | |
| F.O.. BTZ | 7.3 | | |
| Sulfur | 5.9 | 6.6 | |
| Feedstocks Kton/month | 792 | 731 | |
| Mix. crude oils | 731 | 731 | |
| Atm. Residue | −7.5 | | |
| MTBE | −8.1 | | |
| CatFeed | −45.4 | | |
| C&P | 49.9 | 23.2 | −53% |
| Consumptions | 44.3 | 19.6 | −56% |
| Losses | 5.7 | 3.6 | −36% |

The economic data indicated in Table 10 derive from these material balances.

TABLE 10

Economic result

| M€ /month | Base case Ex. 1 | HER Ex. 3 |
|---|---|---|
| Yields from products | 383.3 | 370.9 |
| Syn Gas | 3.6 | |
| Fuel Gas | | 3.9 |
| LPG | 8.8 | 17.3 |
| Gasoline | 118.9 | |
| Virgin Naphtha FR | 6.6 | 95.1 |
| Kero | 42.5 | 47.1 |
| Gasoils | 191.9 | 207.2 |
| F.O.. ATZ/Pitch | 8.3 | 0.2 |
| F.O.. BTZ | 2.7 | |
| Sulfur | — | |
| Crude oil and S/L cost | 336.4 | 336.4 |
| Raw material cost | 28.1 | |
| Atm Residue | 2.7 | |
| MTBE | 5.2 | |
| CataFeed | 20.2 | |
| Total crude oils and MP | 364.5 | 336.4 |
| Operative gross margin | 18.8 | 34.4 |

TABLE 10-continued

Economic result

| M€ /month | Base case Ex. 1 | HER Ex. 3 |
|---|---|---|
| Δ Margin | | +15.7 |
| (€ /ton) | | +21.5 |

This example shows that also in the case of a refinery oriented towards Virgin naphtha for chemistry and gasoils, a high increase in margin is obtained with respect to the base case, even though the complexity, the number of unit operations and consequently the investments required have been further reduced, also with respect to Example 2.

Example 4

The presence of EST allows the refinery to accept heavier feedstocks than those normally processed by a modern complex-cycle refinery and this opportunity further improves the economic returns. The refinery illustrated comprises the same EST section as Example 2 above, from which the same streams are discharged, and functioning under the same operative conditions. This example provides the results obtained from a high-efficiency refinery oriented towards producing gasolines and gasoils, having only ATZ crude oils in the feed, compared with the results of the base case, indicated in Example 1.

The feedstock used for this example is indicated hereunder (in kton/month):

| | |
|---|---|
| BTZ FEEDSTOCKS (37°API, 0.13% S) | 11.0 |
| AMNA (37° API, 0.13% S) | 10.0 |
| AMNA FCC Cycle (37° API, 0.13% S) | 1.0 |
| ATZ FEEDSTOCKS (33°API, 1.3% S) | 720.3 |
| IRANIAN LIGHT (33° API, 1.5% S) | 35.5 |
| URAL (32° API, 1.4% S) | 584.8 |
| CPC BLEND (44° API, 0.22% S) | 61.0 |
| GASOIL s/l (37° API, 2.0% S) | 26.0 |
| SYRIAN LIGHT (38° API, 0.74% S) | 7.7 |
| DPV ex LIV (24° API, 2.39% S) | 5.3 |
| TOTAL | 731.3 |

The high-efficiency refinery scheme is the same provided in Example 2.

The following tables respectively indicate the capacity available/percentage of use (Table 11) and the material balance of the products (Table 12):

TABLE 11

Capacity/use

| Kton/month; % use | Base case Ex. 1 | HER Ex. 4 |
|---|---|---|
| CDU | 731.0 (100%) | 731.0 (100%) |
| VDU | 327.0 (78%) | |
| Gasoil HDS 1 | 46.0 (100%) | 60.0 (100%) |
| Kero HDS 1 | 16.8 (100%) | |
| HDS 2 | 144.0 (100%) | 348.1 (100%) |
| HDS 3 | 72.0 (100%) | 75.6 (100%) |
| EST | | 356.5 (100%) |
| Reforming 2 | 57.0 (100%) | 57.0 (100%) |
| Reforming 3 | 75.0 (100%) | 80.5 (100%) |
| Isomerization | 41.1 (100%) | 63.0 (100%) |
| Hydrogen | 6.0 | 13.7 |
| Alkylation | 17.7 (57%) | |
| ETBE | 3.6 (57%) | |
| FCC | 159.0 (60%) | |
| Hydrocracker 1 | 115.2 (100%) | |
| Hydrocracker 2 | 115.2 (100%) | |

TABLE 11-continued

| Capacity/use | | |
|---|---|---|
| Kton/month; % use | Base case Ex. 1 | HER Ex. 4 |
| Visbreaker | 153.0 (73) | |
| BDA | 48.0 (100%) | |
| Gasification | 36.0 (100%) | |

TABLE 12

| Material Balance | | | |
|---|---|---|---|
| | Base case Ex. 1 | HER Ex 4 | % variat. |
| Products Kton/month | 742.1 | 701.6 | |
| Syn Gas | 35.7 | | |
| Fuel Gas | | 18.4 | |
| LPG | 17.9 | 51.1 | 185% |
| Gasoline | 213.6 | 165.3 | −23% |
| Virgin Naphtha FR | 13.6 | | |
| Kero | 79.0 | 70.8 | −10% |
| Gasoils | 344.2 | 386.0 | +12% |
| F.O. ATZ/Pitch | 24.9 | 3.4 | |
| F.O. BTZ | 7.3 | | |
| Sulfur | 5.9 | 6.6 | |
| Feedstocks Kton/month | 792 | 731.3 | |
| Mix. crude oils | 731 | 731.3 | |
| Atm. Residue | 7.5 | | |
| MTBE | 8.1 | | |
| CatFeed | 45.4 | | |
| C&P | 49.9 | 29.7 | −40% |
| Consumptions | 44.3 | 25.4 | −43% |
| Losses | 5.7 | 4.3 | −25% |

The economic data indicated in Table 13 derive from these material balances.

TABLE 13

| Economic result | | |
|---|---|---|
| M€/month | Base case Ex. 1 | RAE Ex. 3 |
| Yields from products | 383.3 | 379.7 |
| Syn Gas | 3.6 | |
| Fuel Gas | | 9.1 |
| LPG | 8.8 | 18.4 |
| Gasoline | 118.9 | 92.0 |
| Virgin Naphtha FR | 6.6 | |
| Kero | 42.5 | 38.1 |
| Gasoils | 191.9 | 215.3 |
| F.O. ATZ/Pitch | 8.3 | 0.2 |
| F.O. BTZ | 2.7 | |
| Sulfur | — | |
| Crude oil and S/L cost | 336.4 | 330.2 |
| Raw material cost | 28.1 | |
| Atm Residue | 2.7 | |
| MTBE | 5.2 | |
| CatFeed | 20.2 | |
| Total crude oils and MP | 364.5 | 330.2 |
| Operative gross margin | 18.8 | 49.5 |
| Δ Margin | | +30.7 |
| (€/ton) | | +42.0 |

From these results it can be seen that the use of lower quality crude oils allows the refining margins to be improved with respect to the products obtained, achieving a lower cost of the crude oil in the feed with respect to the base case. The advantage of the scheme, object of the present invention, is destined to grow with an increase in the price differential between ATZ crude oils and BTZ crude oils. This factor becomes extremely important with the arrival of non-conventional crude oils on the market, such as, for example, extra heavy crude oils of the Orinoco basin or those obtainable from oil sands and oil shales.

Another important advantage of the invention using the EST technology in substitution of the sub-atmospheric section relates to the marked reduction in consumptions and losses (C&P), which leads to a lower quantity of $CO_2$ emitted into the atmosphere. Table 14 indicates the total and specific consumptions and losses. These values are estimated assuming the value of 3.5 t $CO_2$/per ton of non-consumed equivalent oil with respect to the base case.

TABLE 14

| Reduction in $CO_2$ emission - Consumptions and Losses | | | | |
|---|---|---|---|---|
| | Examples | | | |
| | Ex. 1 | Ex. 2 | Ex. 3 | Ex. 4 |
| Products (Kton/month) | 742.1 | 702.5 | 707.8 | 701.6 |
| Total C&P (Kton/month) | 49.9 | 28.5 | 23.2 | 29.7 |
| Specific C&P (ton/Kton products) | 67.2 | 40.6 | 32.8 | 42.3 |
| Δ vs Base Case | — | −40% | −51% | −57% |
| Minor $CO_2$ emitted (ton/Kton products) | — | 93.1 | 120.4 | 87.1 |

In the case of Example 2, would be lower emissions of $CO_2$ equal to 68 kton/month.

The invention claimed is:
1. A process for refining crude oil consisting essentially of:
   sending the crude oil to a separation unit of the crude oil, the separation unit including at least one atmospheric distillation unit for separating various fractions of the crude oil, units for the conversion of heavy fractions, units for improving the quality of some of the fractions obtained in the atmospheric distillation unit by actions on the chemical composition of their constituents, and units for the removal of undesired components; wherein the step of sending the crude oil to the separation unit includes:
   separating the crude oil into various fractions in the at least one atmospheric distillation unit, the heaviest fraction comprising an atmospheric distillation residue;
   sending the atmospheric distillation fraction to the units for the conversion of heavy fractions, wherein the conversion units comprise at least one hydroconversion reactor in slurry phase or of the ebullated bed type, wherein hydrogen or a mixture of hydrogen and $H_2S$ is introduced in the presence of a nanodispersed hydrogenation catalyst;
   separating non-converted asphaltene liquid from a gas phase obtained from an outlet of the hydroconversion reaction;
   sending the separated, non-converted asphaltene liquid to a vacuum extraction to obtain products having a boiling point higher than 380° C.;
   partially condensing the gas phase obtained either before or after the separation of non-converted asphaltene liquid to obtain products having a boiling point higher than 380° C.;
   sending the products, having a boiling point higher than 380° C., back to said hydroconversion reactor so that the conversion products extracted can be distilled for at least 60% by weight at 380° C.; and
   sending the products having at least 60% by weight at 380° C. and/or some of the fractions obtained from the atmospheric distillation unit to the units for improving the quality of the fractions by actions on the chemical composition of their constituents, and/or to the units for the removal of undesired components.

2. The process according to claim 1, wherein the nanodispersed hydrogenation catalyst is based on a sulfide of Mo and/or Fe and/or W and/or Cr and/or Ni and/or Co and mixtures thereof.

3. The process according to claim 1, wherein, when the hydroconversion reactor is of the ebullated bed type, a suitable heterogeneous, supported hydroconversion co-catalyst is also present.

4. The process according to claim 1, wherein, when the hydroconversion reactor is in slurry phase, a suitable heterogeneous, supported hydroconversion co-catalyst is also present.

5. The process according to claim 3, wherein the co-catalyst has particles of nanometric or micronic dimensions and is selected from cracking and/or denitrogenation catalysts.

6. The process according to claim 1, wherein the distillation residue is sent to at least one hydroconversion reactor with solid accumulation in slurry phase, wherein one or more stripping phases are included, with a suitable hot stripping gas so as to obtain conversion products in vapour phase.

7. The process according to claim 1, wherein the distillation residue is sent to a hydroconversion reactor with solid accumulation in slurry phase of the bubbling tower type, in the presence of a catalyst based on molybdenum so as to obtain conversion products in vapour phase directly in the reactor.

8. The process according to claim 1, wherein the units for improving the quality of the fractions are selected from isomerization units and/or reforming units.

9. The process according to claim 1, wherein the units for the removal of undesired components comprise desulfurization units.

* * * * *